(12) United States Patent
Hu et al.

(10) Patent No.: US 8,012,642 B2
(45) Date of Patent: *Sep. 6, 2011

(54) POWER SUPPLY APPARATUS HAVING PLURALITY OF PLANAR FUEL CELL ASSEMBLIES CONNECTED IN STACK FORM

(75) Inventors: Sheng-Yan Hu, Taoyuan Hsien (TW); Hsi-An Liu, Taoyuan Hsien (TW); Chen-Yu Yu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 26 days.

This patent is subject to a terminal disclaimer.

(21) Appl. No.: 12/549,273

(22) Filed: Aug. 27, 2009

(65) Prior Publication Data

US 2009/0317681 A1 Dec. 24, 2009

Related U.S. Application Data

(63) Continuation of application No. 11/225,831, filed on Sep. 13, 2005, now Pat. No. 7,597,989.

(30) Foreign Application Priority Data

Dec. 8, 2004 (TW) .............................. 93138006 A

(51) Int. Cl.
*H01M 8/02* (2006.01)
*H01M 8/24* (2006.01)
(52) U.S. Cl. ......... 429/455; 429/468; 429/470; 429/513
(58) Field of Classification Search .................. 429/455, 429/468, 469, 470, 513, 514
See application file for complete search history.

(56) References Cited

U.S. PATENT DOCUMENTS

| | | | | |
|---|---|---|---|---|
| 6,743,536 B2* | 6/2004 | Fuglevand | ....................... | 429/9 |
| 6,998,188 B2* | 2/2006 | Petillo | ........................... | 429/513 |
| 7,597,989 B2* | 10/2009 | Hu et al. | ....................... | 429/411 |
| 2004/0197633 A1* | 10/2004 | Yamamoto et al. | ............. | 429/34 |
| 2005/0164064 A1* | 7/2005 | Cho et al. | ........................ | 429/34 |

* cited by examiner

*Primary Examiner* — Stephen J. Kalafut

(57) ABSTRACT

A power supply apparatus comprising a plurality of planar fuel cell assemblies is disclosed. Each planar fuel cell assembly comprises two fuel cell members, a channel-forming member interposed between the two fuel cell members and defining a first channel for flowing a fluid fuel along with the two fuel cell members, and a coupling member to be coupled with an adjacent planar fuel cell assembly to define a second channel for flowing an ambient air, wherein the coupling member has a plurality of openings for flowing the ambient air therethrough.

22 Claims, 14 Drawing Sheets

POWER SUPPLY APPARATUS HAVING PLURALITY OF PLANAR FUEL CELL ASSEMBLIES CONNECTED IN STACK FORM

CROSS-REFERENCE TO RELATED APPLICATIONS

This is a continuation application of U.S. patent application Ser. No. 11/225,831, filed on Sep. 13, 2005, and entitled "POWER SUPPLY APPARATUS HAVING PLURALITY OF PLANAR FUEL CELL ASSEMBLIES CONNECTED IN STACK FORM", now issues as Pat. No. 7,597,989. The entire disclosures of the above applications are all incorporated herein by reference.

BACKGROUND OF THE INVENTION

Fuel cells are well known and are commonly used to produce electrical energy by means of electrochemical reactions. Comparing to the conventional power generation apparatus, fuel cells have advantages of less pollutant, lower noise generated, increased energy density and higher energy conversion efficiency. Fuel cells can be used in portable electronic products, home-use or plant-use power generation systems, transportation, military equipment, the space industry, large-size power generation systems, etc.

According to the electrolytes used, fuel cells are typically classified into several types, e.g. an alkaline fuel cell (AFC), a phosphoric acid fuel cell (PAFC), a molten carbonate fuel cell (MCFC), a solid oxide fuel cell (SOFC) and a proton exchange membrane fuel cell (PEMFC). Depending on types of the fuel cells, the operation principles are somewhat different. For example, in the case of a direct methanol fuel cell (DMFC) which has the same structure as the PEMFC but uses liquid methanol instead of hydrogen as a fuel source, methanol is supplied to the anode, an oxidation reaction occurs in the presence of a catalyst, and protons, electrons and carbon dioxide are generated. The protons reach the cathode through the proton exchange membrane. Meanwhile, in the cathode, oxygen molecules take electrons from the anode and are reduced to oxygen ions by reduction. The oxygen ions react with hydrogen ions from the anode and thus produce water.

As know, an individual fuel cell unit supplies limited voltage (approximately 0.4 V). For a purpose of offering a sufficient operating voltage to an electronic product, a plurality of fuel cell units should be connected in series so as to form a fuel cell assembly. Depending on the arrangement of the fuel cell units, the fuel cell assemblies can be divided into two types, i.e. a stacked fuel cell assembly and a planar fuel cell assembly.

Referring to FIG. 1, an exploded view of a conventional stacked fuel cell assembly is illustrated. The stacked fuel cell assembly 10 comprises at least two membrane-electrolyte assemblies (MEAs) 11, a bipolar plate 12 located between two adjacent MEAs 11 and two electrode plates 13 and 14 at opposite ends of the cell assembly. Each MEA 11 includes an anode 111, a proton exchange membrane 112 and a cathode 113. The bipolar plate 12 comprises a plurality of channels 121 for flowing fuels and oxygen molecules therethrough. However, since the stacked fuel cell assembly 10 requires a large amount of cell units to be assembled in a stack form, the thickness and the weight thereof are considerably high. Therefore, the usage of such stacked fuel cell assembly is restricted in some situations.

Referring to FIG. 2, a planar fuel cell assembly 20 comprises a metal frame 21, a plurality of membrane-electrolyte assemblies (MEAs) 22 and two electrode plates 23 and 24 at opposite ends of the cell assembly. Likewise, each MEA 22 includes an anode, a proton exchange membrane and a cathode (not shown), and is embedded in the corresponding openings 211 of the frame 21. Furthermore, two current collectors 212 are disposed at one side of the frame 21 as the current output terminals of the planar fuel cell assembly 20. Each of the electrode plates 23 and 24 comprises channels 231 for flowing fuels and oxygen molecules therethrough. However, the metal frame 21 used in the planar fuel cell assembly 20 is both bulky and weighty. In addition, the procedure of aligning the MEAs 22 in the corresponding opening 211 of the frame 21 is complex and time-consuming. Such planar fuel cell assembly 20 is costly to manufacture, and also contribute a substantial weight and volume to the overall fuel cell assembly. In other words, such planar fuel cell assembly fails to be used in portable electronic products.

SUMMARY OF THE INVENTION

The present invention provides a power supply apparatus including a plurality of planar fuel cell assemblies connected in a stack form, in which the power supply apparatus is easily assembled, suitable for mass production and capable of offering a sufficient operating voltage In accordance with the present invention, there is provided a power supply apparatus comprising a plurality of planar fuel cell assemblies. Each planar fuel cell assembly comprises two fuel cell members, a channel-forming member interposed between the two fuel cell members and defining a first channel for flowing a fluid fuel along with the two fuel cell members, and a coupling member to be coupled with an adjacent planar fuel cell assembly to define a second channel for flowing an ambient air, wherein the coupling member has a plurality of openings for flowing the ambient air therethrough.

In an embodiment, each of the two fuel cell members comprises a plurality of fuel cell units connected in series. Each fuel cell unit comprises a meshed metal plate and a membrane-electrolyte assembly, the membrane-electrolyte assembly of each fuel cell unit having a first side in contact with a second portion of the meshed metal plate and a second side in contact with a first portion of the meshed metal plate of an adjacent fuel cell unit. The meshed metal plate of each fuel cell unit is made by punching a plurality holes in a metal piece. Each membrane-electrolyte assembly includes an anode, a proton exchange membrane and a cathode. The first portion and the second portion of the meshed metal plate are disposed at different levels by a gap.

In an embodiment, the channel-forming member further comprises a fuel inlet and a fuel outlet for introducing and discharging the fluid fuel, respectively.

In an embodiment, the power supply apparatus further comprises a fan disposed at a side thereof. Alternatively, the power supply apparatus further comprises a blower for inhaling the ambient air, and a plurality of air-directing pipes in fluid communication with the second channel so as to gather and direct the ambient air.

In an embodiment, the coupling member comprises first and second coupling parts respectively disposed at outsides of the two fuel cell members.

In an embodiment, each of the first and second coupling parts comprises several clasp sheets extending from an outer surface thereof to be engaged with ones of an adjacent planar fuel cell assembly.

In an embodiment, each of the first and second coupling parts comprises several recess structures to be engaged with ones of an adjacent planar fuel cell assembly via an intermediate plate, and the intermediate plate has several protrudent rods at periphery thereof to be engaged with corresponding cavities in each of the recess structures.

In an embodiment, the channel-forming member is integrally formed of a plastic material by an injection molding process.

In an embodiment, each planar fuel cell assembly further comprises a circuit connection member disposed at a bottom thereof to electrically connect with an adjacent planar fuel cell assembly, and the circuit connection member comprises a first circuit connection portion disposed under the second channel and a second circuit connection portion disposed under the first channel. The first circuit connection portion has at least one protrudent block on an edge thereof, and the second circuit connection portion has at least one depression structure corresponding to the protrudent block.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
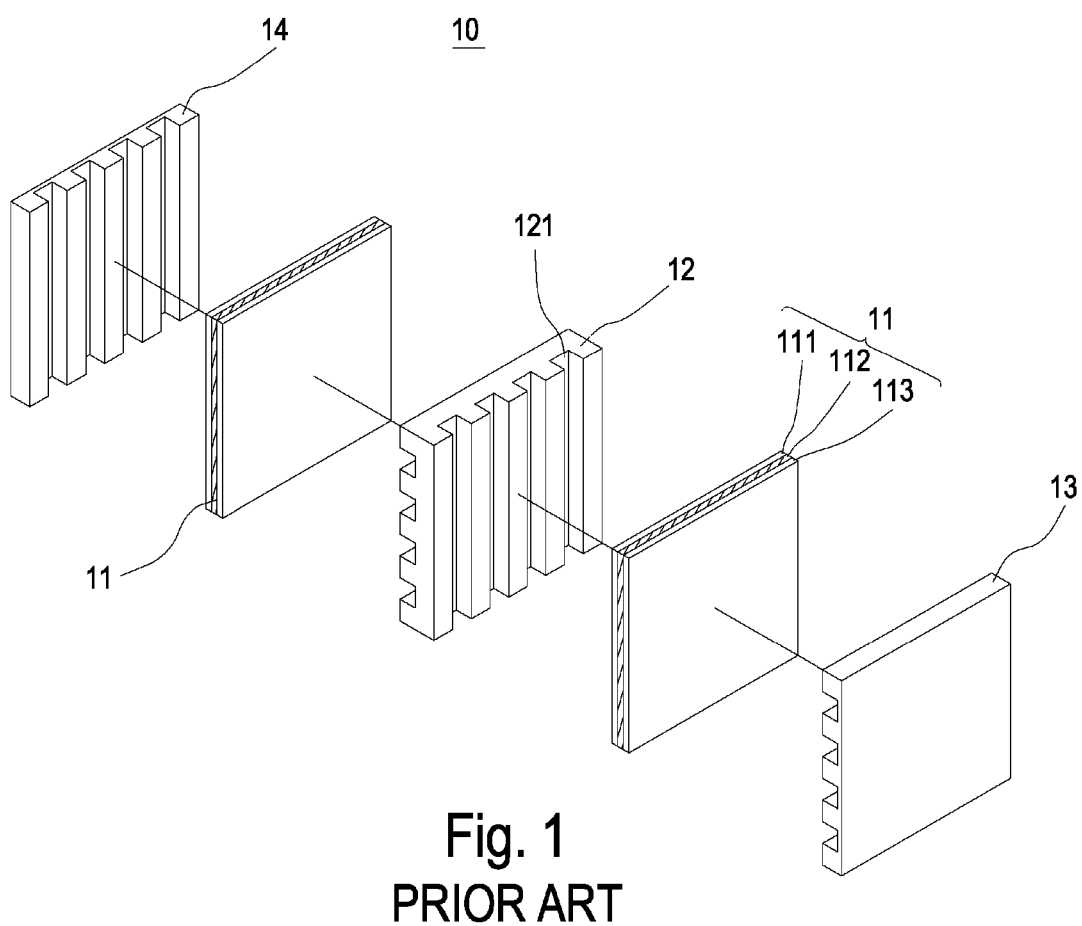
FIG. 1 is an exploded view of a stacked fuel cell assembly according to prior art.
Figure 2:
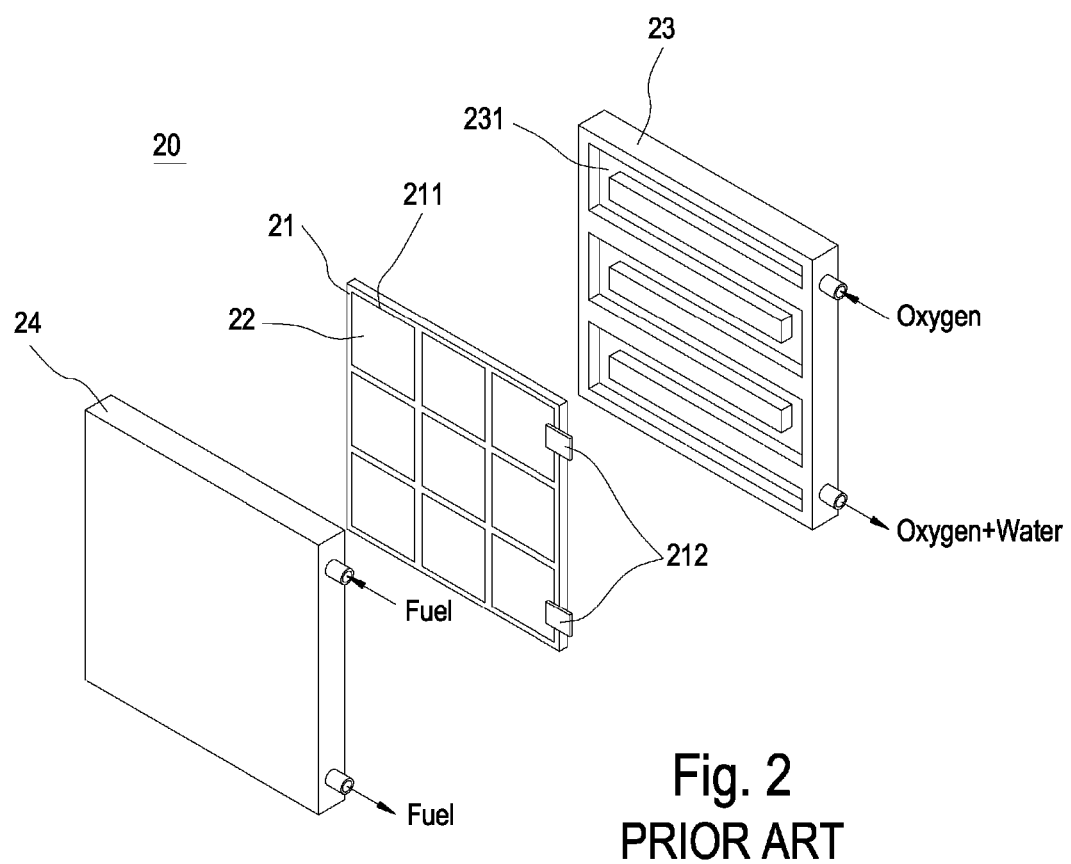
FIG. 2 is an exploded view of a planar fuel cell assembly according to prior art.
Figure 3A:
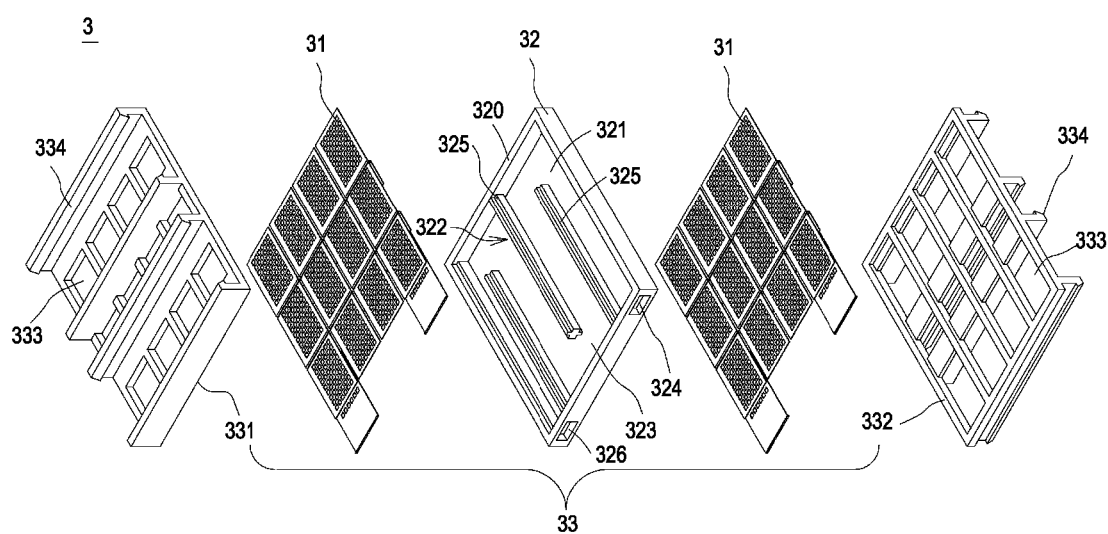
FIG. 3(A) is an exploded view illustrating a planar fuel cell assembly of a power supply apparatus according to a preferred embodiment of the present invention.
Figure 3B:
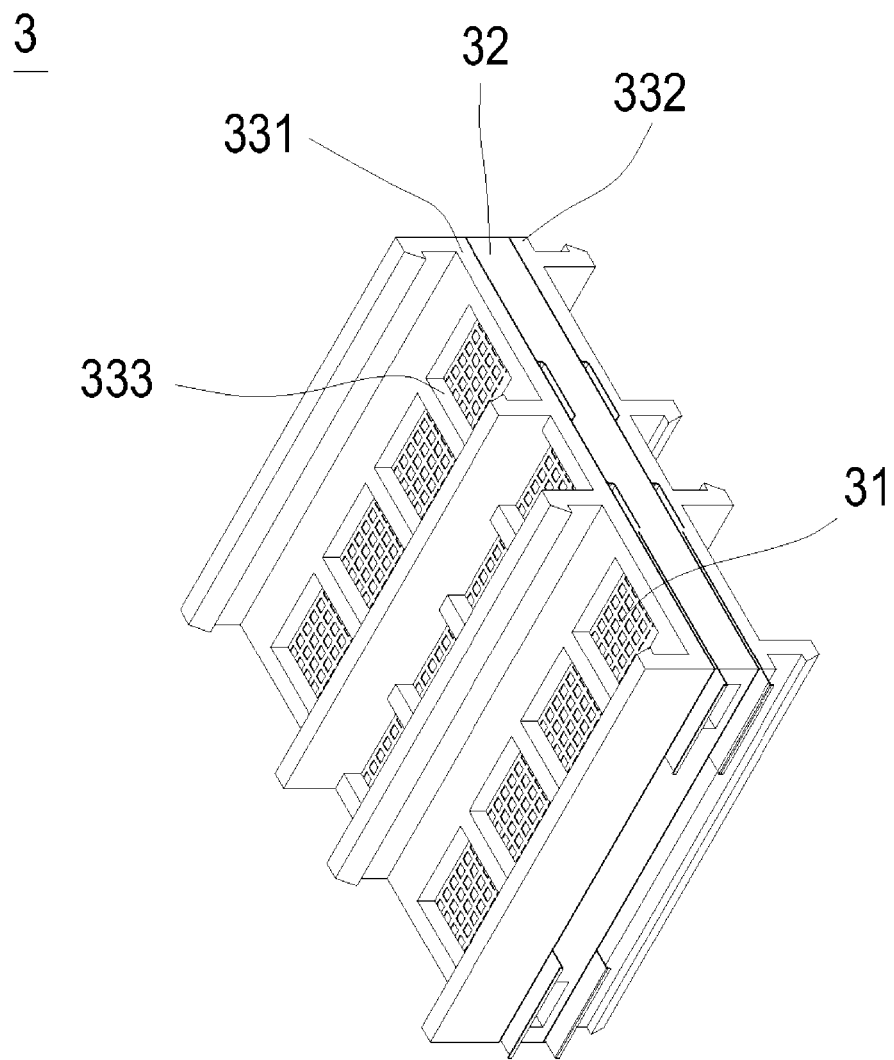
FIG. 3(B) is a perspective view of the planar fuel cell assembly in FIG. 3(A)

Referring to FIGS. 3(A) and 3(B), a planar fuel cell assembly of a power supply apparatus according to a preferred embodiment of the present invention is shown. In this embodiment, the planar fuel cell assembly 3 comprises two fuel cell members 31, a channel-forming member 32 and a coupling member 33. The channel-forming member is disposed between these two fuel cell members 31. The coupling member 33 comprises a first coupling part 331 and a second coupling part 332, which are respectively disposed at the outsides of the two fuel cell members 31. The first coupling part 331 and the second coupling part 332 have many openings 333 such that the surfaces of these two fuel cell members 31 are exposed to the ambient air. In addition, several clasp sheets 334 extend from the outer surfaces of the first coupling part 331 and the second coupling part 332. The number of clasp sheets 334 on the first coupling part 331 is equal to that on the second coupling part 332. The clasp of the clasp sheet 334 on the first coupling part 331 of this planar fuel cell assembly 3 will be engaged with the corresponding one on the second coupling part 332 of an adjacent planar fuel cell assembly (not shown). Whereas, the clasp of the clasp sheet 334 on the second coupling part 332 of this planar fuel cell assembly 3 will be engaged with the corresponding one on the first coupling part 331 of another adjacent planar fuel cell assembly (not shown). The channel-forming member 32 comprises a hollow portion 321 enclosed by the protrudent edges 320 thereof. Several raised rods 322 are extended from two opposite edges toward the hollow portion 321. The raised rods 322, along with the two fuel cell members 31 and the protrudent edges 320, define a channel 323 for flowing a fluid fuel therethrough. The channel-forming member 32 is further provided with a fuel inlet 324 and a fuel outlet 326 for introducing and discharging the fluid fuel, respectively. There are many supporting blocks 325 disposed beside the protrudent edges 320 and the raised rods 322 for supporting the fuel cell units 31.

Figure 4A:
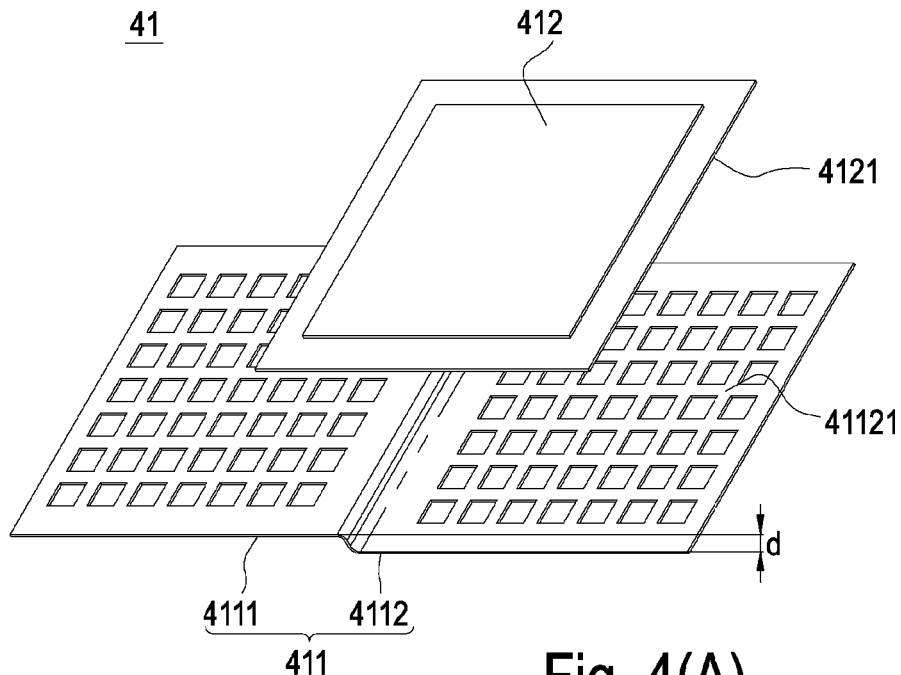
FIG. 4(A) is an exploded view of a fuel cell unit.
Figure 4B:
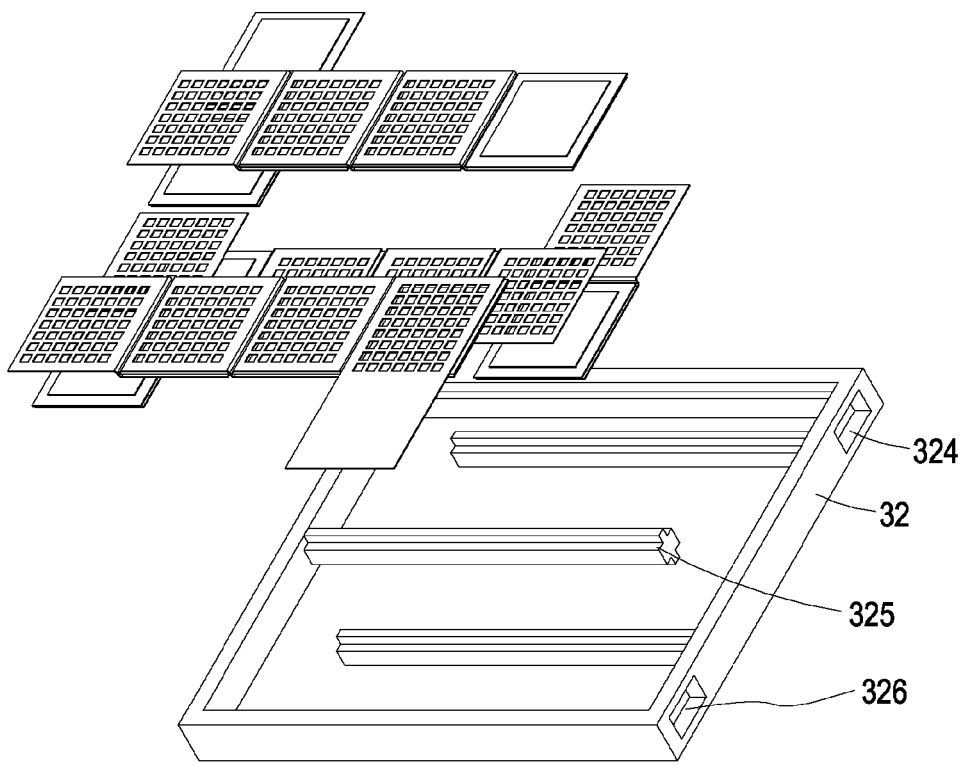
FIG. 4(B) is an exploded view illustrating a plurality of fuel cell units of FIG. 4(A) connected in series and coupled to the channel-forming member.

Referring to FIG. 4(A), a fuel cell unit 41 constituting an individual fuel cell member 31 of FIG. 3 is shown. In this embodiment, the fuel cell unit 41 comprises a meshed metal plate 411 and a membrane-electrolyte assembly (MEA) 412. The meshed metal plate of each fuel cell unit is made by punching a plurality holes in a metal piece. The meshed metal plate 411 comprises a first portion 4111 and a second portion 4112 disposed at different levels by a gap of "d". The MEA 412 is disposed on the second portion 4112, and includes an anode, a proton exchange membrane and a cathode (not shown). The first side 4121 of the MEA 412 is in contact with the top surface 41121 of the second portion 4112. For a purpose of offering a sufficient operating voltage to an electronic product, several fuel cell units 41 of FIG. 4(A) should be connected in series and supported on the supporting blocks 325 of the channel-forming member 32 so as to form the fuel cell member 31, as is shown in FIG. 4(B). Likewise, the identical number of fuel cell units 41 are connected in series and mounted on the opposite side of the channel-forming member 32. The resultant structure is then covered with the coupling member 33 to form the planar fuel cell assembly 3 of FIG. 3.

Take a direct methanol fuel cell (DMFC) for example. During operation of such planar fuel cell assembly 3, methanol is supplied into the channel 323 of the channel-forming member 32 via the fuel inlet 324. In the anode, an oxidation reaction occurs in the presence of a catalyst, and thus protons, electrons and carbon dioxide are generated. The protons reach the cathode through the proton exchange membrane to the cathode. The oxygen molecules containing in the air will flow through the meshed metal plate of the individual fuel cell unit to the cathode. Meanwhile, in the cathode, oxygen molecules take electrons from the anode and are reduced to oxygen ions by reduction. The oxygen ions react with hydrogen ions from the anode and thus produce water.

Figure 5:
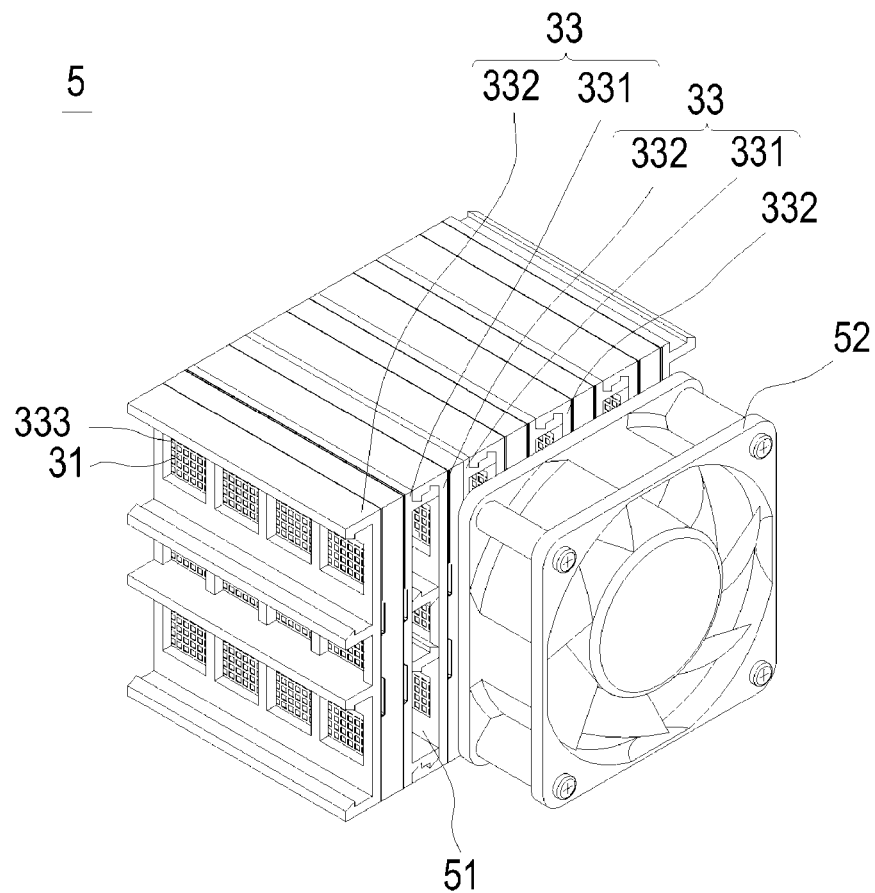
FIG. 5 is a perspective view of a power supply apparatus according to a first preferred embodiment of the present invention.

For a purpose of offering a sufficient operating voltage to an electronic product, a plurality of planar fuel cell assemblies 3 shown in FIG. 3(B) should be connected in a stack form. Referring to FIG. 5, every planar fuel cell assembly 3 is coupled with adjacent one via the clasp sheets 334 thereon so as to result in a power supply apparatus 5. The clasp of the clasp sheet 334 on the first coupling part 331 of any planar fuel cell assembly 3 will be engaged with the corresponding one on the second coupling part 332 of an adjacent planar fuel cell assembly (not shown). Whereas, the clasp of the clasp sheet 334 on the second coupling part 332 will be engaged with the corresponding one on the first coupling part 331 of another adjacent planar fuel cell assembly (not shown). After the engagement of two adjacent planar fuel cell assemblies 3, an airflow channel 51 is defined between the first coupling part 331 of one planar fuel cell assembly and the second coupling part 332 of the other planar fuel cell assembly. In addition to the airflow channel 51, the openings 333 of the first coupling part 331 and the second coupling part 332 will allow the ambient air to flow through the meshed metal plate of the individual fuel cell unit to the cathode. For a purpose of enhancing amount of the supplied oxygen molecules and thus increasing the reaction in the cathode, a fan 52 is provided at one side of the power supply apparatus 5.

In the above embodiments, the clasps of clasp sheets 334 on the first coupling part 331 are somewhat different from those on the second coupling part 332. Therefore, the first coupling part 331 and the second coupling part 332 should be separately fabricated. In order to reduce the fabricating complexity, the first coupling part 331 and the second coupling part 332 can be made identical. In other words, the coupling member 33 may be modified.

Figure 6:
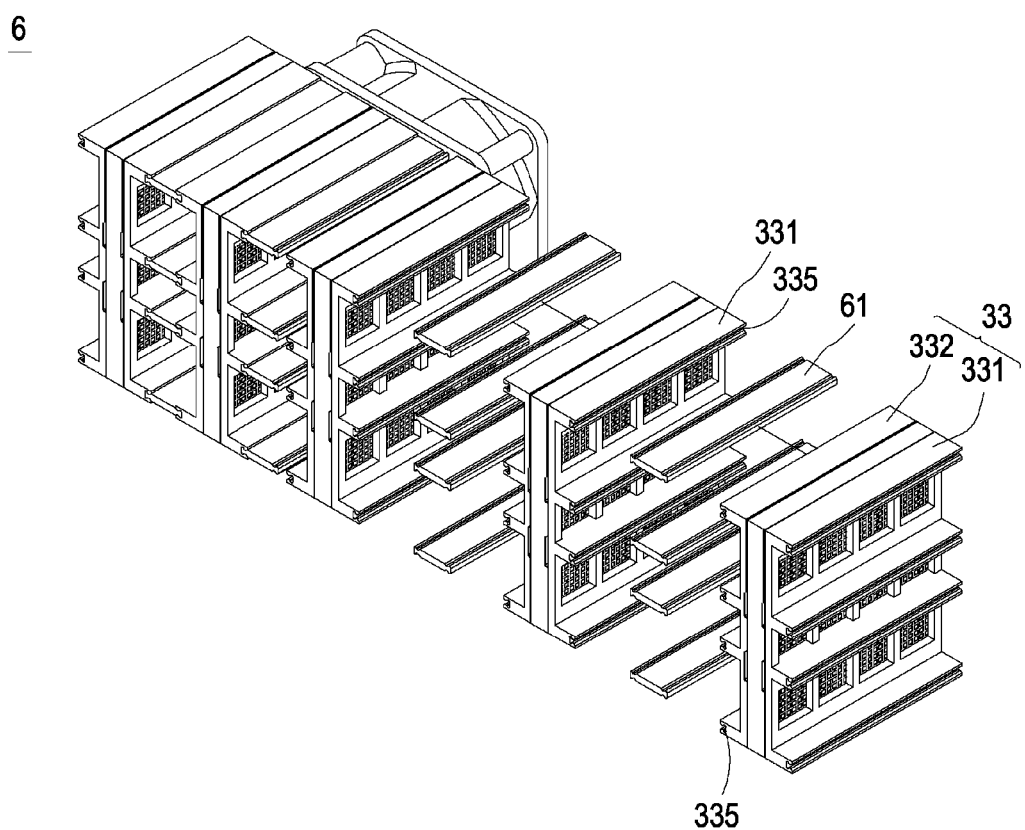
FIG. 6 is a perspective view of a power supply apparatus according to a second preferred embodiment of the present invention.

A further embodiment of a power supply apparatus is illustrated in FIG. 6. In this embodiment, the fuel cell members and the channel-forming member included therein are similar to those shown in FIG. 5, and are not to be redundantly described herein. However, the coupling member 33 further comprises several intermediate plates 61, and the clasp sheets 334 on the first coupling part 331 and on the second coupling part 332 are replaced by recess structures 335. By the engagement of the intermediate plates 61 with the recess structures 335 of two adjacent planar fuel cell assemblies, the power supply apparatus 6 is assembled.

Figure 7:
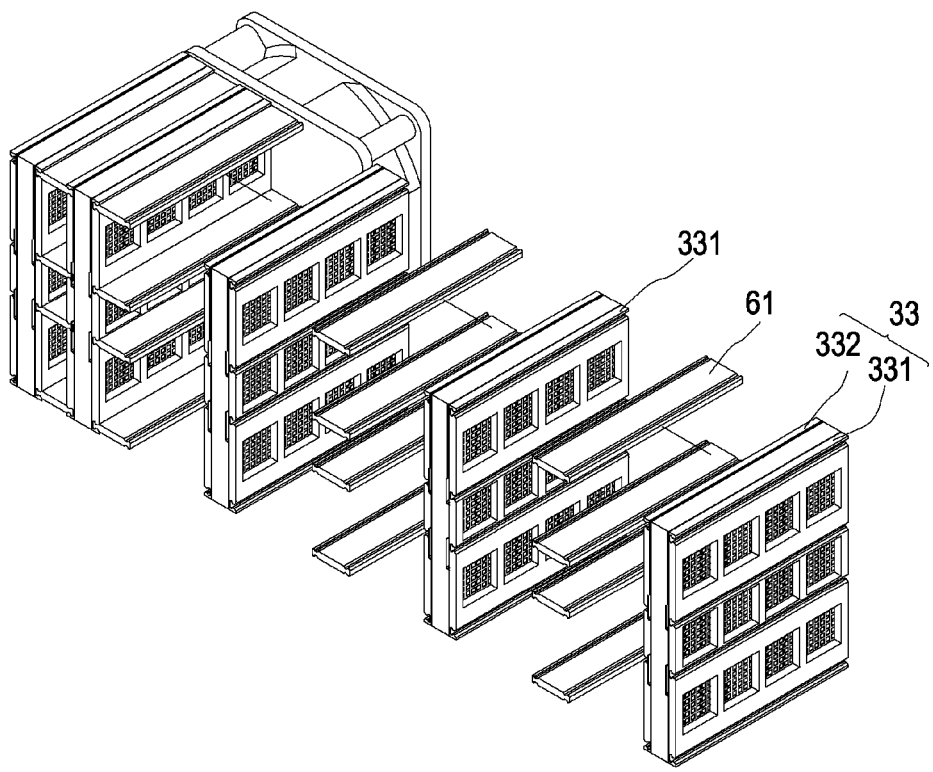
FIG. 7 is a perspective view of a power supply apparatus according to a third preferred embodiment of the present invention.

A further embodiment of a power supply apparatus is illustrated in FIG. 7. In this embodiment, the intermediate plates 61 of the coupling member 33 included therein are similar to those shown in FIG. 6. However, widths of the first coupling part 331 and the second coupling part 332 are as short as possible so as to reduce the overall volume of the power supply apparatus 7.

Figure 8:
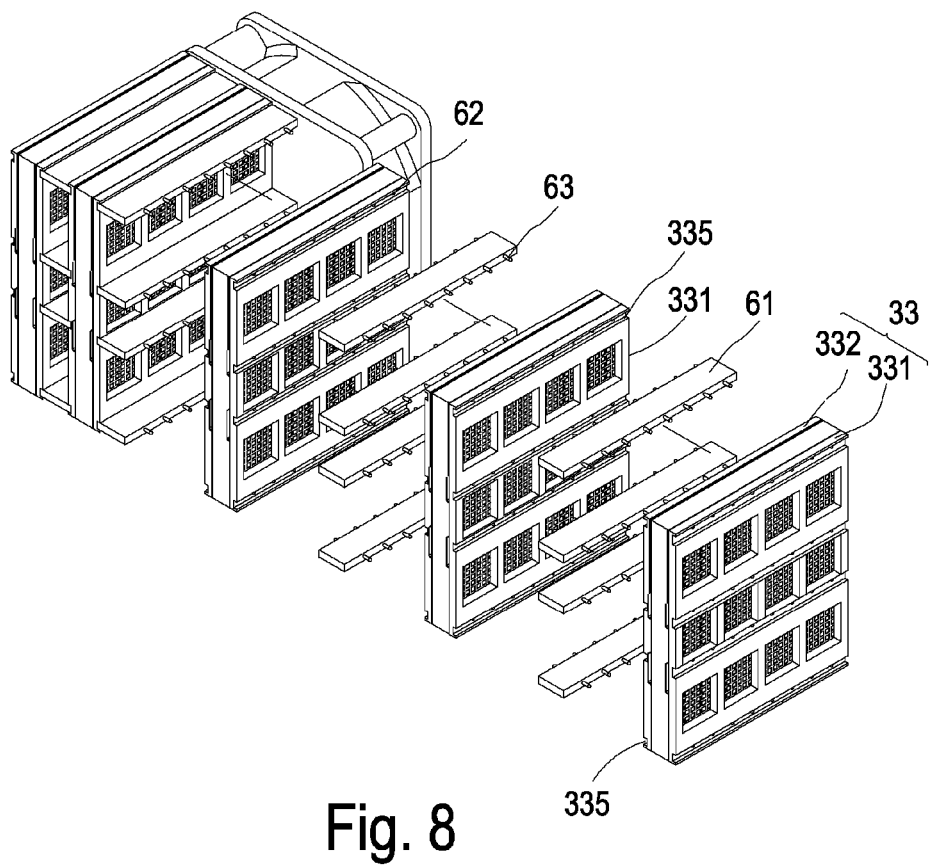
FIG. 8 is a perspective view of a power supply apparatus according to a fourth preferred embodiment of the present invention.

A further embodiment of a power supply apparatus is illustrated in FIG. 8. In this embodiment, the periphery of the intermediate plate 61 has several protrudent rods 63. At the locations corresponding to the protrudent rods 63, the recess structures 335 of the first coupling part 331 and on the second coupling part 332 further comprise several cavities 62. By the engagement of the protrudent rods 63 with the cavities 62 of two adjacent planar fuel cell assemblies, the power supply apparatus 8 is assembled.

Figure 9A:
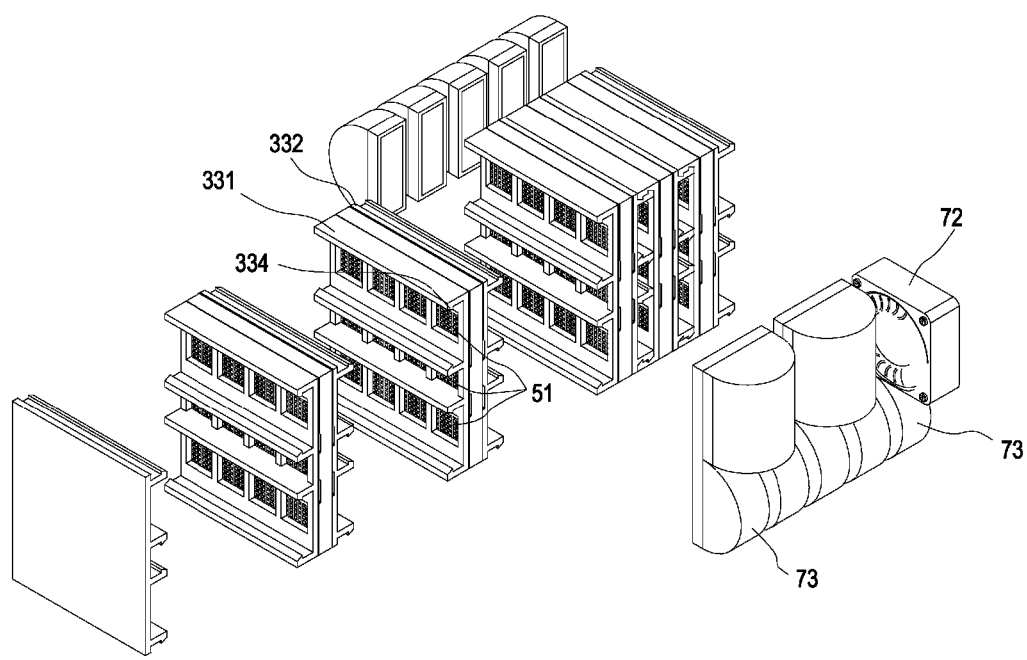
FIG. 9(A) is an exploded view of a power supply apparatus according to a fifth preferred embodiment of the present invention.
Figure 9B:
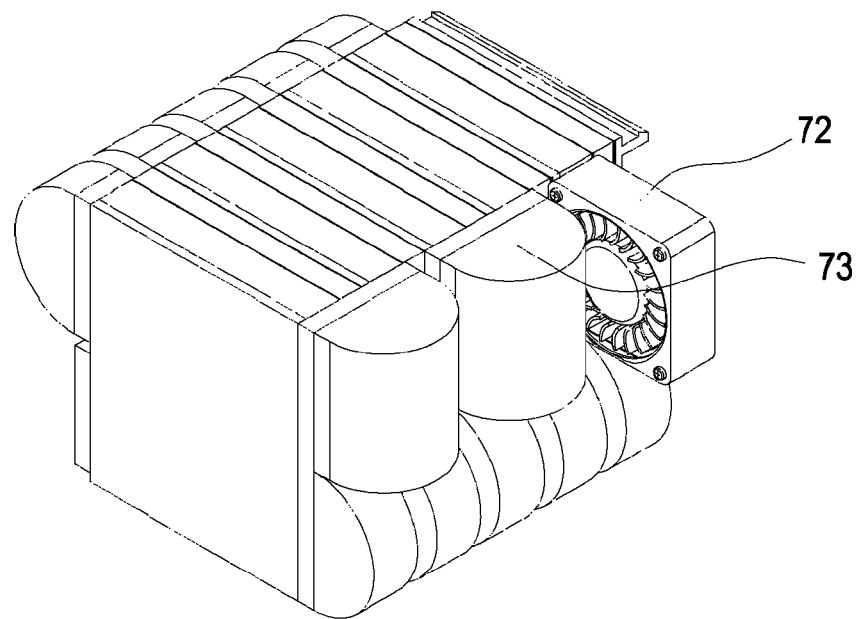
FIG. 9(B) is a perspective view of the power supply apparatus in FIG. 9(A)

A further embodiment of a power supply apparatus is illustrated in FIGS. 9(A) and 9(B). In this embodiment, the fuel cell members and the channel-forming member included therein are similar to those shown in FIG. 5, and are not to be redundantly described herein. However, the fan 52 can be replaced with a blower 72. Via the blower 72, the ambient air will be inhaled into the power supply apparatus. In addition, several air-directing pipes 73 are in fluid communication with the airflow channels 51 between two adjacent planar fuel cell assemblies. The ambient air passing through the airflow channels 51 will be gathered together and directed by the air-directing pipe 73 in a specified direction. Therefore, the reaction efficiency in the cathode is largely increased.

In the above embodiments, the engagement of the recess structure with the intermediate plate or the engagement of the protrudent rod with the cavity is presented herein for purpose of illustration and description only. The shape, size or number of the coupling member is not limited to the precise form disclosed. In addition, the size of the channel-forming member preferably conforms to the width of each planar fuel cell assembly. Preferably, the channel-forming member is integrally formed of a plastic material by an injection molding process.

Figure 10:
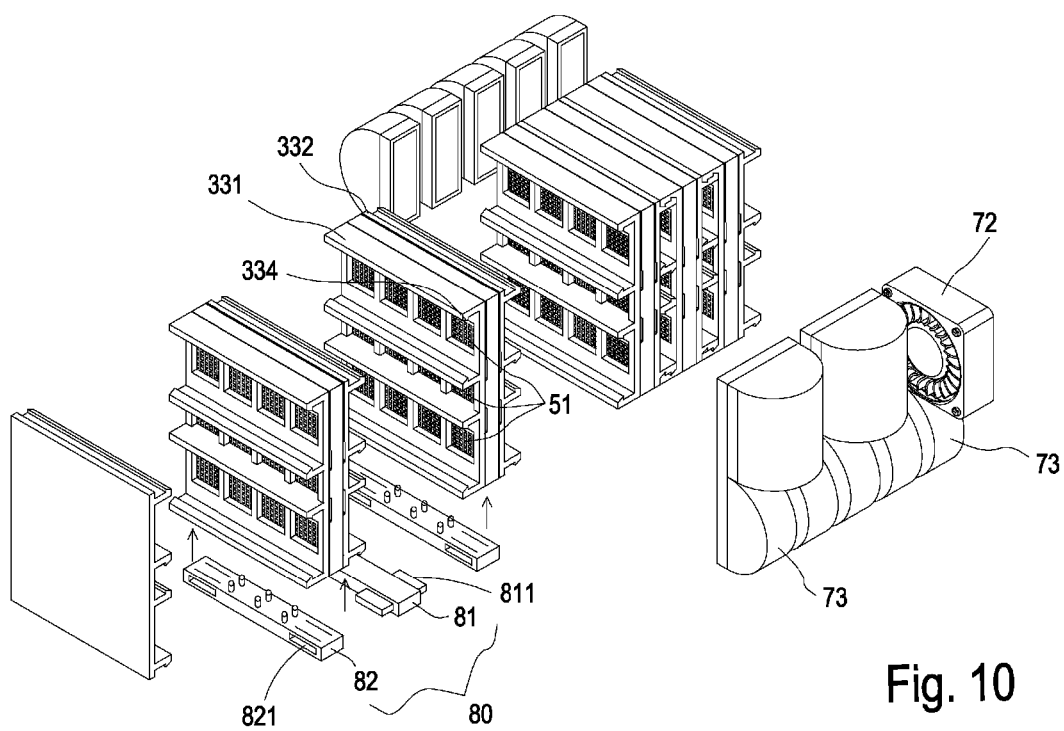
FIG. 10 is a perspective view of a power supply apparatus according to a sixth preferred embodiment of the present invention.
Figure 11A:
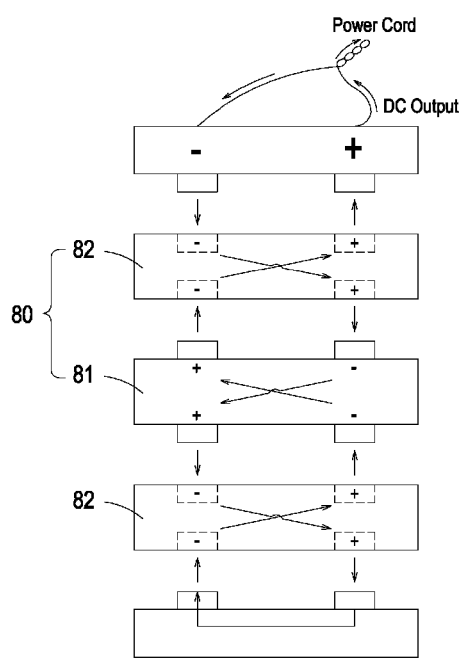
FIGS. 11(A), 11(B) and 11(C) are schematic views illustrating the circuit connection configuration of adjacent planar fuel cell assemblies.
Figure 11B:
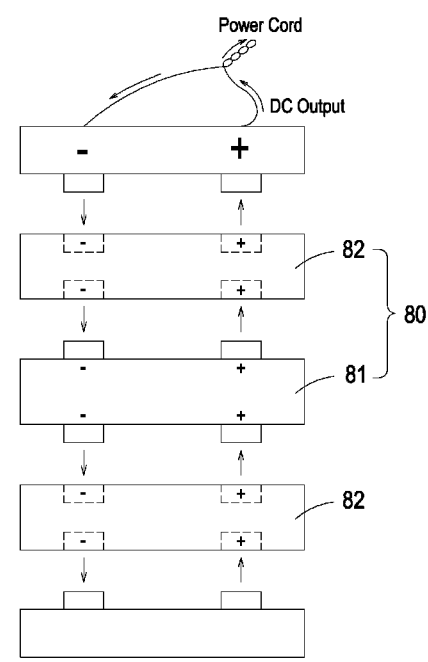
Figure 11C:
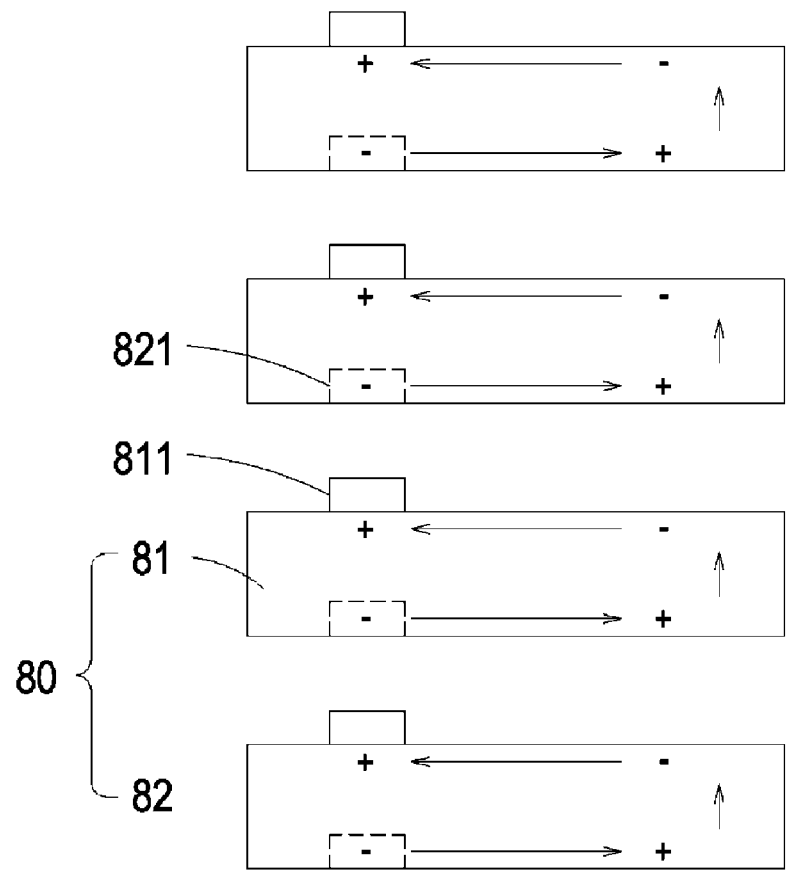

Moreover, the power supply apparatus of the present invention further comprises a circuit connection member. Referring to FIG. 10, the circuit connection member 80 is disposed at the bottom (or top) of the power supply apparatus and comprises a first circuit connection portion 81 and a second circuit connection portion 82. The first circuit connection portion 81 is disposed under the airflow channels 51 between two adjacent planar fuel cell assemblies and has several protrudent blocks 811 on the edges thereof. The second circuit connection portion 82 is disposed under the channel-forming member 32 and has depression structures 821 engaged with the protrudent blocks 811 of an adjacent first circuit connection portion 81. The protrudent blocks 811 and the depression structures 821 have conductive surfaces. Via the circuit connection member 80, every two adjacent planar fuel cell assemblies can be electrically connected with each other in series or in parallel. As shown in FIG. 11(A), the internal circuits of the first circuit connection portion 81 and the second circuit connection portion 82 are arranged such that the positive electrodes thereof are electrically connected to the negative electrodes. In such manner, every two adjacent planar fuel cell assemblies can be electrically connected with each other in series. Alternatively, in FIG. 11(B), the internal circuits of the first circuit connection portion 81 and the second circuit connection portion 82 are arranged such that the like electrodes thereof are electrically connected to the like electrodes. Therefore, every two adjacent planar fuel cell assemblies can be electrically connected with each other in parallel. Furthermore, in order to simplify the fabricating process, these circuit connection portions can have identical structures. For example, as shown in FIG. 11(C), each of the first circuit connection portion 81 and the second circuit connection portion 82 has a protrudent block 811 on a side thereof and a depression structure 821 on the opposite side thereof. Via the engagement of the protrudent block 811 with the depression structure 821, every two adjacent planar fuel cell assemblies can be electrically connected with each other in series.

From the above description, the power supply apparatus of the present invention is stacked by a plurality of planar fuel cell assemblies. The arrangement of the fan or blower facilitates enhancing amount of the supplied oxygen molecules and thus increasing the reaction in the cathode. Since every two adjacent planar fuel cell assemblies can be electrically connected with each other in series, this power supply apparatus can offer more sufficient operating voltage as required.

Alternatively, the pot life of the power supply apparatus can be increased when every two adjacent planar fuel cell assemblies are electrically connected with each other in parallel. Since the bulky metal frame and the bipolar plate used in the conventional planar fuel cell assembly are omitted, the overall weight of the present planar fuel cell assembly is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply apparatus comprising at least one planar fuel cell assembly, the planar fuel cell assembly comprising a fuel cell unit, a channel-forming member, and a coupling member, the fuel cell unit to be interposed between the channel-forming member and the coupling member so as to define a first channel and a second channel respectively, the first channel adapted for flowing a fluid fuel along with the fuel cell unit, the second channel adapted for flowing ambient air, wherein the coupling member has at least one opening for flowing ambient air therethrough.

2. The power supply apparatus according to claim 1 wherein the fuel cell assembly comprises a plurality of fuel cell units connected in series.

3. The power supply apparatus according to claim 2 wherein each fuel cell unit comprises a meshed plate and a membrane-electrode assembly, the membrane-electrode assembly of each fuel cell unit having a first side in contact with a second portion of the meshed plate and a second side in contact with a first portion of the meshed plate of an adjacent fuel cell unit.

4. The power supply apparatus according to claim 3 wherein the meshed plate of each fuel cell unit is made of electrically conductive material.

5. The power supply apparatus according to claim 3 wherein the meshed plate of each fuel cell unit is made by punching a plurality of holes in a piece of electrically conductive material.

6. The power supply apparatus according to claim 3 wherein the meshed plate of each fuel cell unit is made by etching a plurality of holes in a piece of electrically conductive material.

7. The power supply apparatus according to claim 3 wherein the meshed plate of each fuel cell unit is made by molding a plurality of holes in a piece of electrically conductive material.

8. The power supply apparatus according to claim 3 wherein each membrane-electrode assembly includes an anode, a proton exchange membrane and a cathode.

9. The power supply apparatus according to claim 3 wherein the first portion and the second portion of the meshed plate are disposed at different levels by a gap.

10. The power supply apparatus according to claim 1 wherein the channel-forming member further comprises a fuel inlet and a fuel outlet for introducing and discharging the fluid fuel, respectively.

11. The power supply apparatus according to claim 1 further comprising a fan disposed at a side thereof.

12. The power supply apparatus according to claim 1 further comprising:
 a blower for inhaling ambient air; and
 at least one air-directing pipe in fluid communication with second channel so as to gather and direct ambient air.

13. The power supply apparatus according to claim 1 further comprising:
 an air pump for inhaling ambient air; and
 at least one air-directing pipe in fluid communication with second channel so as to gather and direct ambient air.

14. The power supply apparatus according to claim 1 wherein the coupling member comprises a coupling part disposed at outside of the fuel cell unit.

15. The power supply apparatus according to claim 14 wherein the coupling part comprises several clasp sheets extending from an outer surface thereof to be engaged with ones of an adjacent planar fuel cell assembly.

16. The power supply apparatus according to claim 14 wherein the coupling part comprises several recess structures to be engaged with ones of an adjacent planar fuel cell assembly via an intermediate plate.

17. The power supply apparatus according to claim 16 wherein the intermediate plate has several protrudent rods at a periphery thereof to be engaged with corresponding cavities in each of the recess structures.

18. The power supply apparatus according to claim 1 wherein the channel-forming member is made of electrically non-conductive material.

19. The power supply apparatus according to claim 1 wherein the channel-forming member is integrally formed of a plastic material by an injection molding process.

20. The power supply apparatus according to claim 1 wherein each planar fuel cell assembly further comprises a circuit connection member disposed at a bottom thereof to electrically connect with an adjacent planar fuel cell assembly.

21. The power supply apparatus according to claim 20 wherein the circuit connection member comprises a first circuit connection portion disposed under the second channel and a second circuit connection portion disposed under the first channel.

22. The power supply apparatus according to claim 21 wherein the first circuit connection portion has at least one protrudent block on an edge thereof, and the second circuit connection portion has at least one depression structure corresponding to the protrudent block.

* * * * *